United States Patent [19]

Pfannkuchen

[11] Patent Number: 5,090,888
[45] Date of Patent: Feb. 25, 1992

[54] DIE CASTING MOLD PART

[76] Inventor: Ernst Pfannkuchen, Höllentalstrasse 4, D-8104 Grainau, Fed. Rep. of Germany

[21] Appl. No.: 593,857

[22] Filed: Oct. 5, 1990

[30] Foreign Application Priority Data

Oct. 5, 1989 [DE] Fed. Rep. of Germany ....... 8911864
Apr. 12, 1990 [DE] Fed. Rep. of Germany .......... 4011784716

[51] Int. Cl.$^5$ .................. B29C 33/42; B29C 33/48; B29D 1/00
[52] U.S. Cl. ................... 425/438; 425/440; 425/441; 425/577; 425/DIG. 58; 249/59; 249/179; 249/180; 249/184
[58] Field of Search ............ 249/63, 64, 59, 66.1, 249/178, 180, 184, 179; 425/577, 556, 438, 440, 443, DIG. 58, 441, 442, 443

[56] References Cited

U.S. PATENT DOCUMENTS

| | | | |
|---|---|---|---|
| 3,618,170 | 11/1971 | Owens | 249/59 |
| 3,642,417 | 2/1972 | Von Holdt | 425/443 |
| 3,843,088 | 10/1974 | McLoughlin et al. | 249/59 |
| 4,130,264 | 12/1978 | Schröer | 249/59 |
| 4,456,214 | 6/1984 | Ruck et al. | 249/59 |
| 4,541,605 | 9/1985 | Kubota et al. | 249/59 |
| 4,618,121 | 10/1986 | Conti | 249/59 |
| 4,771,981 | 9/1988 | Little et al. | 425/577 |
| 4,956,142 | 9/1990 | Mangone et al. | 249/180 |

*Primary Examiner*—Jay H. Woo
*Assistant Examiner*—Khanh P. Nguyen
*Attorney, Agent, or Firm*—Penrose L. Albright

[57] ABSTRACT

A die casting mold part, which may be mounted on or applied to a die casting mold to provide for the molding and shaping of a variety of projections from the molded article and a simple and sure release from the mold of such projections including a plurality of projections lying closely adjacent to one another and extending outside the mold separation plane. The mold part includes segments, which are received in a bore that guides them and holds them together to form a die casting cavity, the segments together thus forming a mold at one of their ends. On their opposite end they flare outwardly and are mounted pivotally on a central control shaft so that they are caused to be opened where together they formed a mold, by relative movement between the control shaft and bore.

8 Claims, 2 Drawing Sheets

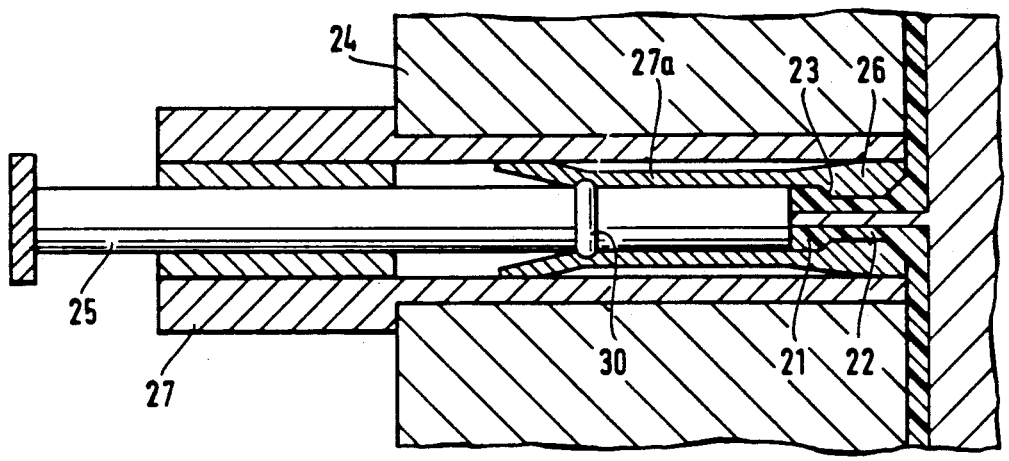
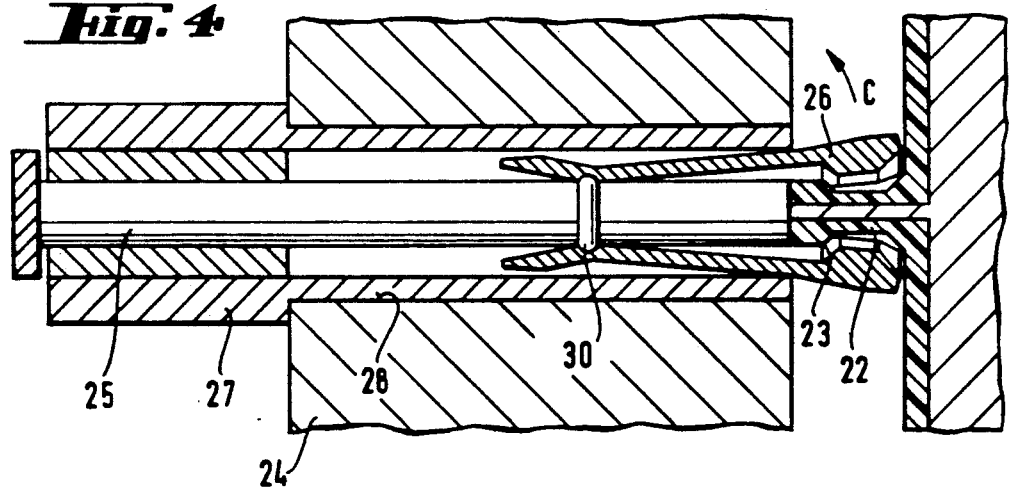

DIE CASTING MOLD PART

BACKGROUND OF THE INVENTION

It is demonstratably important when manufacturing articles by a die casting process, particularly in the construction of the individual parts which perform functions in that manufacturing process, and even more so in the construction of the die casting molds themselves, to provide whenever possible, that only one mold separation plane exists. This is to provide that when the mold parts are separated from one another, the manufactured article may be easily removed from the opened mold. If this is not possible, then one seeks at least to provide as few separation planes as feasible; in other words—the die casting mold should comprise as few parts as possible. Thus, for instance, a four-part mold may be employed wherein, during opening of the mold, two parts are moved away from one another horizontally and the remaining two parts are moved away from one another vertically. Where this too is impossible, for example, when the article to be manufactured has projections and it is thus necessary to mold connection pieces that project beyond the mold separation planes, slides or carriages integrated into the mold may be provided which are moved under positive control, either before opening the mold or when the mold is being opened.

Such slides or carriages materially increase the cost of a die casting mold. Also, it is difficult to employ or incorporate them into the casting machinery where a plurality of projections with undercuts or back tapers extend closely adjacent one another, as required by the structure of an article, wherein for example, they are projections for connections to tubes, piping or the like whereby the connections include flanges, beads, threads, etc. which extend beyond the mold separation plane.

SUMMARY OF THE INVENTION

An object of the invention is a die casting mold part of simple construction, which may be simply mounted on a mold, and which allows for molding or shaping with a simple release of projecting parts, especially of a plurality of projections arranged closely adjacent to one another on a workpiece. The invention comprises a component received in a mold part that would otherwise define the plane of separation. The projection to be cast is defined by a plurality of mold segments which each have a bent portion disposed outwardly beyond the projection and a jaw portion which, when closed, forms the cavity to receive the material that is to be cast as the projection. An intermediate portion connects the bent and jaw portions of each segment. The component also includes a sheath that surrounds the segments and retains the jaw portions together so that the cavity to cast material received therein into the desired projection is formed. A movable shaft extends within the bent and intermediate portions of each segment. This shaft is connected by an annular part thereof to the segments so by sliding the shaft, the segments are movable together relative to the aforesaid mold part. Either the sheath or the projection includes an annular inclined surface that causes the jaw portions to open outwardly when such movement of the mold part occurs so that they no longer grasp the now cast projection and can be pulled free therefrom. At the same time the bent portions are brought together so that each segment, in effect, pivots or tilts inwardly in a small arc on about the annular part. The entire operation is automatic, being actuated by moving mold parts together to form the mold or apart to effect their separation. Different segments may be used depending upon the desired characteristics of the projection which are easily installed or removed whereas the other parts of the component remain the same. The invention was developed specifically for the manufacture of articles made of plastic to which the following description, in particular, relates, but which may also be used for manufacture of articles made of metal such as aluminum.

Other objects, adaptabilities and capabilities will be appreciated by those skilled in the art, from the following Specification wherein the invention is illustrated by two exemplary embodiments that are described hereinafter relative to said drawings.

BRIEF DESCRIPTION OF THE DRAWINGS

In reference to the drawings:

FIG. 3 shows in cross-section a simplified construction of a die casting mold part according to the invention in the die casting phase; and FIG. 4 is similar to FIG. 3, but shows the mold release phase.

DETAILED DESCRIPTION OF THE INVENTION

Figure 1:
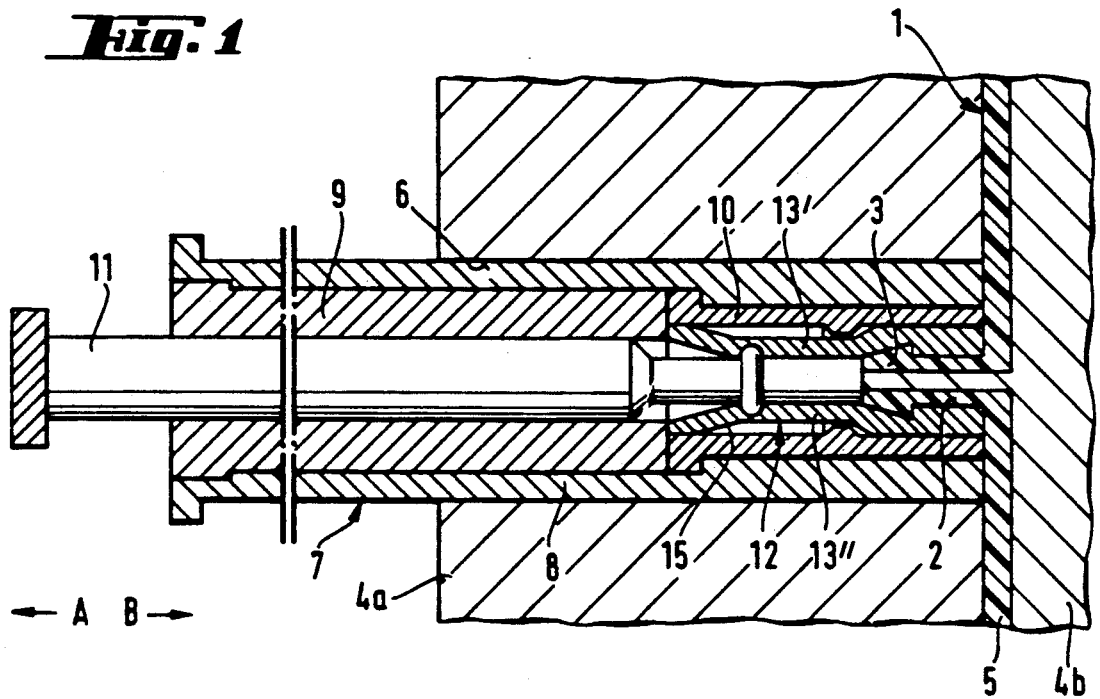
FIG. 1 is a vertical cross section of the invention in the die casting phase.

Reference numeral 1 designates in general a part which is being cast and which includes a projection or connection piece 2, terminating in a flange 3, both of which extend beyond the mold separation plane. Reference 4a designates a mold part and 4b, a counter-mold part which together serve to mold or shape the wall 5 of part 1. In other words, the liquified plastic flows into the clearances defined between 4a and 4b during the die casting process to form part 1.

When constructing the mold component according to the invention, as an additional component which is to be incorporated in an already existing die casting mold as a structural module for molding, shaping and releasing connection piece 2 with flange 3, such component, designated generally by reference numeral 7, is introduced into a bore or opening 6 that is provided in mold part 4a for the purpose of receiving such component. Component 7 comprises an outside sheathing 8, in which are fitted a slide sheathing 9 and a control sheathing 10 which are axially concentric along their common longitudinal axes. Slidable sheathing 9 receives, in a bore provided therethrough, a control shaft 11 which is also concentric to the aforesaid longitudinal axes, along which slide sheathing 9 may be moved in the directions of arrows A and B, whereas control sheathing 10 receives the actual mold part 12 which serves as a mold to cast and shape connection piece 2.

Figure 2:
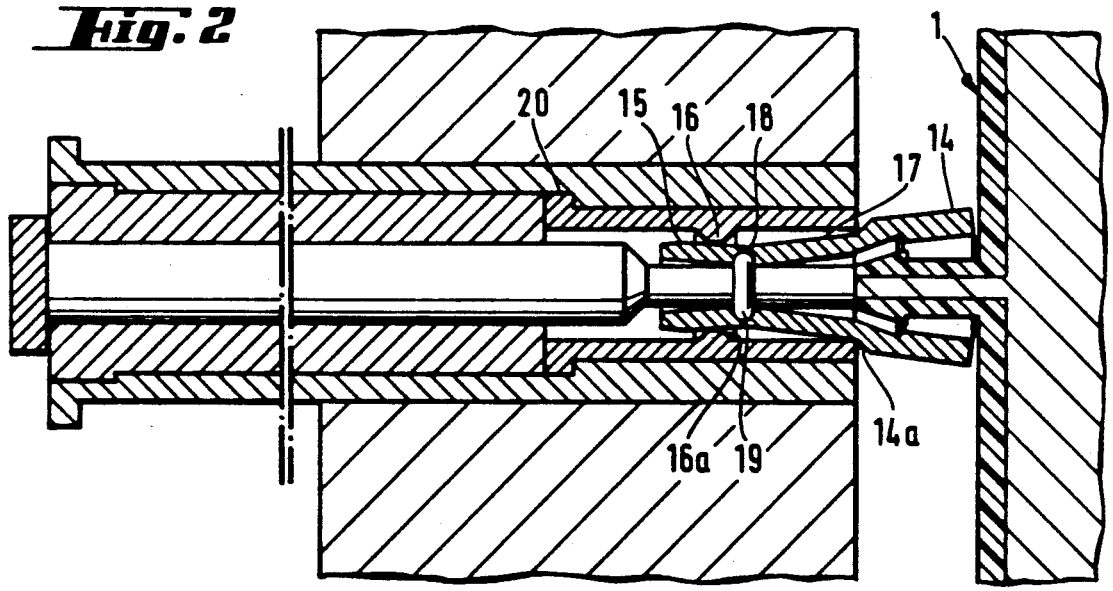
FIG. 2 is similar to FIG. 1, and depicts the invention in the mold release phase.

Mold part 12 comprises separate contracting segments which are disposed concentrically, for example, four segments, two of which, segments 13' and 13", are visible in FIGS. 1 and 2.

At one end, the segments, or more specifically mold jaws 14 (designated in FIG. 2), together form the mold for connection piece 2, or other similar projections, and at the opposite end, deposed at an outwardly diverging angle (as seen in FIG. 1), they comprise lobes 15, which cooperate in a manner described hereinafter with a detent 16 defined by sheathing 10. Also, segments 13, at the transition between shafts 17 and lobes 15, are held by a radial pivot member 19 disposed as an extension of control pin 11, so that they cooperate with a common radial spline 18.

Control sheathing 10 may be extended by means of flange 20, disposed between an inside radial offset of the outside sheathing 8 and the slide sheathing 9. On the side of the mold adjacent to the jaws 14, detent 16 comprises a oblique surface 16a. Segments 13 comprise, on the inside, corresponding oblique surfaces 14a. When closing the mold, oblique surface 14a engages oblique surface 16a, thus preventing further rearward thrusting of jaws 14 and thereby preventing wedging.

Following the die casting process, mold part 4a is pulled back in the direction of arrow A to open the mold, and die casting mold part 7 simultaneously matches this movement. Control shaft 11 retains its position, relative to mold part 4a, and control sheathing 10 is moved as indicated in the drawing, until detent 16 engages lobe 15 of segments 13 and thereafter presses lobes 15 inward against the extension of control shaft 11, whereupon the jaws 14, receiving the molded projection 2, are separated to release that molded projection.

It is also possible to remove component 7, including sheathings 8, 9 and 10, from bore 6 by means of a mechanism, for instance, a hydraulic motor that causes it to move relatively in the direction of arrow A, whereupon the same effect is obtained.

Finally, if mold part 4b also moves, relatively, in the direction of arrow A, control shaft 11 will eventually be caused to move in the same direction, thereby carrying segments 13 along with it until their lobes 15 engage detent 16 whereby they move inwardly together and open the mold jaws 14 which are thereby caused to move outwardly.

Detent 16 may also be molded directly in bore 6. And, in such case, sheathings 9 and 10 may be eliminated.

The projection may be formed in such a manner that, after sufficient solidification, it or some of its surfaces are disposed to exert a force on corresponding surfaces of the jaws of the segments when they are being withdrawn, as illustrated in FIGS. 3 and 4. In such case, positive control by detent 16 or any additional part incorporated on control sheathing 10, or both, is unnecessary.

In the embodiments as illustrated in FIGS. 3 and 4, a flange 21 of connection piece 22 is formed so that its inside surface 23, during movement between a mold part 24 and a sliding pin 25, exerts a force that causes mold jaws 26 to spread apart in the direction indicated by arrow C, whereupon segments 27a directly engage the surface of sheathing 27 at its adjacent opening, or the interior surfaces of bore 28 to pivot relative to part 30, thus freeing the molded and shaped connection piece 22.

A plurality of die casting mold components, as described above, may also be combined in a single piece member so that parts shaped by segments under positive control as in FIGS. 1 and 2, and also parts molded automatically by shaped parts as illustrated in FIGS. 3 and 4, may be molded and shaped simultaneously by that single piece member. Thus, for instance, the additional mold parts may be combined for any two connection pieces lying closely adjacent to one another in the same plane and then again for two more connection pieces lying farther along in the single piece member. Two or more sets of segments 14 may be provided side-by-side, each set with its own control or with common controls.

The die casting mold parts, according to the invention, may also be readily incorporated in existing molds. In other words, existing molds may be readily modified for situations wherein it is required or desired to incorporate one or more connection pieces onto the plastic article to be molded and shaped, and the slides or carriages which would otherwise be present in the mold need not be retained.

Although the preferred embodiments of my invention are described above, it is to be understood that it is capable of other adaptions and modifications within the scope of the invention as claimed herein.

Having disclosed my invention, what I claim as new and to be secured by Letters Patent of the United States are the following:

1. A die casting mold part for the manufacture of projections, including connection pieces, provided with flanges, beads, threads, undercuts or back tapers and like configurations provided for receiving other components, on a plastic or metal workpiece when the projections are located outside a mold separation plane, wherein said mold part comprises a plurality of segments which are received in a member defining a bore that guides and retains said segments together so that they function as a casting part that surrounds and forms the projections, said segments at one end forming a mold emplacement, and a central control shaft, said segments and said control shaft defining pivot means opposite said casting part for pivoting said segments whereby said segments are pivotally mounted on said central control shaft and are opened outwardly at said casting part by relative movement between said control shaft and said member defining said bore.

2. A die casting mold part as claimed in claim 1, wherein each said segment comprises a mold jaw where said segments function as a casting part, a bent lobe extending away from said pivot means relative to said mold jaw, and an intermediate shaft part interconnecting said mold jaw and said bent lobe.

3. A die casting mold part as claimed in claim 1, wherein said member comprises a sheathing, said segments being received in said sheathing which guides them and holds them together.

4. A die casting mold part as claimed in claim 2, wherein an annular detent is defined in said bore at a location to engage said bent lobes of said segments for opening said mold jaws when said relative movement occurs and said bent lobe are engaged by said annular detent.

5. A die casting mold part as claimed in claim 1, wherein said segments are received in a sheathing which includes an inside annular detent, wherein during said relative movement portions of each said segment engage said annular detent whereby each said segment is caused to pivot and to open parts of said segments where together they function as said casting part.

6. A die casting mold part as claimed in claim 5, wherein said detent comprises an oblique surface facing said parts of said segments that function as said casting part to cooperate with a further oblique surface disposed on the inside of said parts of said segments that functions as said casting part to cause an inward movement of said segments relative to said pivot means to close said parts of said segments that function as said casting part.

7. A die casting mold part as claimed in claim 1, wherein said pivot means comprises an annular bulge extending from said control shaft to maintain said segments slidable and pivotal in corresponding recesses in said member.

8. A die casting mold part as claimed in claim 1, which is included with a plurality of like die mold casting parts in a single piece member.

* * * * *